though the diversity polarization reception technique has been recognized heretofore, no adequate means of presenting the information derived by this technique has been developed.

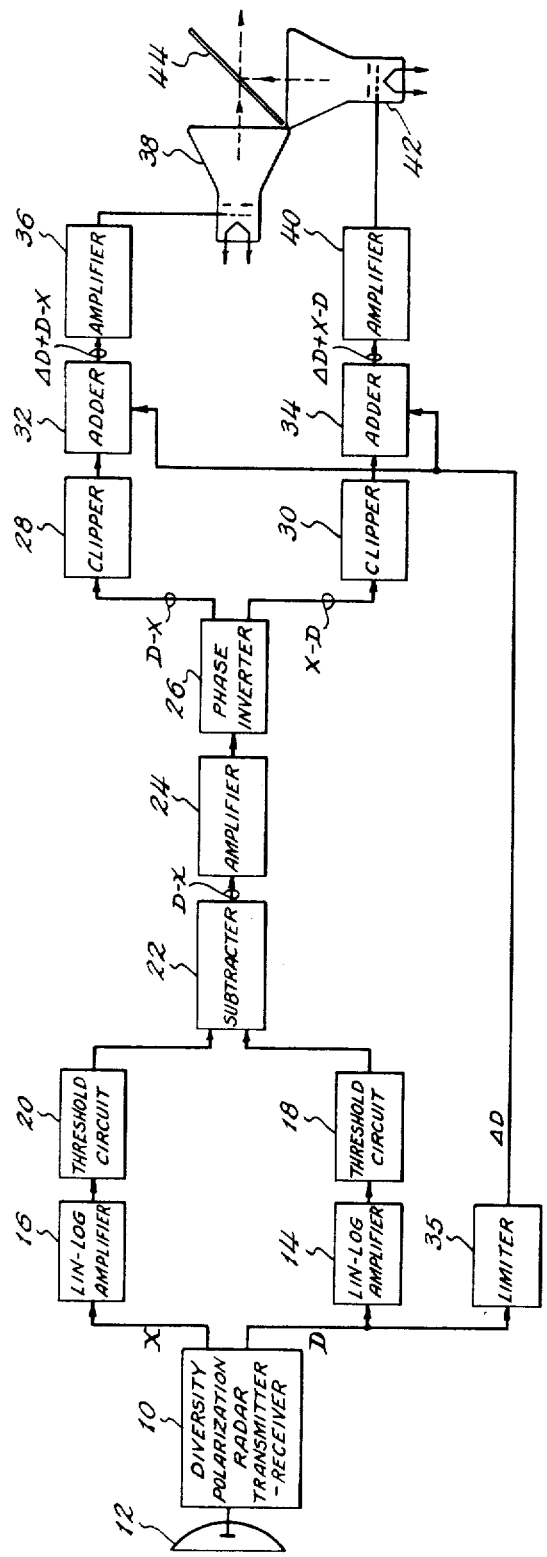

It is therefore a general object of this invention to provide a diversity polarization receiver having an improved indicator.

Another object of this invention is the provision of an indicator in which targets are identified by whether they produce a predominantly directly-polarized return or a predominantly cross-polarized return.

Another object of this invention is to provide an indicator in which targets of either polarization characteristics can be readily distinguished from ground clutter.

3,403,397
DUOCHROMATIC INDICATOR FOR A DIVERSITY POLARIZATION RADAR RECEIVER
Roger C. Harrington, Mineola, and George R. Latham IV, Great Neck, N.Y., assignors to Sperry Rand Corporation, a corporation of Delaware
Filed Oct. 14, 1955, Ser. No. 540,773
9 Claims. (Cl. 343—7.9)

The invention herein described was made in the course of or under a contract or subcontract thereunder, with the Department of the Air Force.

This invention relates generally to diversity polarization radar reception, and more particularly, is concerned with a duochromatic type indicator for presenting target information derived from a diversity polarization receiver.

Location of specific ground targets from conventional radar presentations is a difficult problem which frequently leads to unsuccessful operation where such presentations are employed. This difficulty stems from the fact that the conventional presentation does not give the "break up" of ground targets which is necessary for recognizing individual targets. The use of a two-tone presentation improves the situation somewhat because it permits ground mapping and large targets to appear at different intensities. In some areas this ground mapping is distinctive enough due to identifying landmarks, such as coastlines, rivers, lakes, etc., to permit accurate location of specific targets for navigation or bombing purposes. However, in many inland areas such identifying landmarks are not available, and navigation and bombing requires accurate identification of the natural and man-made targets that are present. Since these targets often appear in large complex groups, the identification of any specific target is very difficult. This latter situation is aggravated by the limited dynamic range of the phosphors which are used in long-persistence radar indicators.

By the present invention improved target recognition is achieved through the use of information derived from the diversity polarization reception (DPR) technique for identifying the ground targets more precisely than is possible by conventional radar mapping. In a DPR system the received microwave energy is resolved into two mutually orthogonal components, the directly-polarized component and the cross-polarized component.

Since only objects which have very simple geometric shapes reflect incident waves without change of polarization, it is to be expected that the complex geometry of many radar targets produces reflected waves of polarization characteristics considerably different from those of the incident wave. Thus all complex targets made up of irregular or non-symmetrical surfaces reflect a cross-polarized wave in addition to the one having the same polarization as the transmitted wave. Since the target has its own distinct polarization characteristics, DPR provides a means of achieving improved target identification. While the diversity polarization reception technique has been recognized heretofore, no adequate means of presenting the information derived by this technique has been developed.

Another object of this invention is to provide an indicator in which targets producing a strong return appear in one of two colors depending upon their polarization characteristic, while the weaker ground clutter return appears in a neutral color.

These and other objects of the invention which will become apparent as the description proceeds are achieved by the provision of a pair of cathode ray indicator tubes having phosphors of different colors, with means for superimposing the images produced on the two indicator tubes. Video signals are derived from a suitable diversity polarization receiver, the video signals corresponding respectively to the directly-polarized component and the cross-polarized component of the received microwave signals. These two component signals having an amplitude above a predetermined threshold value are applied to a difference circuit for producing a signal proportional to the difference in amplitude of the two types of return. A limited directly-polarized component signal is then added to the subtracted output and applied to the intensity control of one of the indicator tubes. This limited directly-polarized component signal is also added to a phase inverted version of the subtracted output and applied to the intensity control of the other cathode ray indicator tube. The result is that targets producing a strong return of one polarization characteristic appear in one color on the indicator while targets producing a strong return of the other polarization characteristic are produced on the indicator in a second color, while signals of relatively weak return, such as ground clutter, are applied to both cathode ray indicator tubes, producing ground mapping indication in a neutral color.

For a better understanding of the invention, reference should be had to the accompanying drawing, wherein the single figure is a block diagram of the diversity polarization receiver and indicator of the present invention.

In the drawing, the numeral 10 indicates generally a diversity polarization radar transmitter and receiver, which may be of the type described in more detail in Patent No. 2,619,635. Microwave energy is transmitted by an antenna 12, the received energy reflected by targets back to the antenna 12 being separated by the diversity polarization radar receiver into a directly-polarized component indicated as D, and a cross-polarized component indicated as X.

Video pulses in the directly-polarized and cross-polarized component channels of the diversity polarization receiver are coupled resepctively to lin-log amplifiers 14 and 16, which have a linear response to signals of small amplitude and logarithmic response to signals of large amplitude. This type of amplifier is provided to compress the wide dynamic range of targets into a narrower dynamic range which can be handled by the balance of the indicator circuit. Lin-log type of amplifiers are well known and can be found described in more detail in volume 23 of the MIT Radiation Laboratory Series, McGraw-Hill, 1947, page 583.

The outputs of the respective lin-log amplifiers are coupled to threshold circuits 18 and 20. These threshold circuits are of the conventional diode clipping circuit type which set a threshold level which must be exceeded in amplitude by the input video signals from the lin-log amplifiers to produce an output signal. These threshold circuits are preferably made adjustable to permit control of the number of targets that appear on the indicator. This feature is useful when flying over industrial areas since the presentation may be simplified to include only outstanding targets.

The output signals from the threshold circuits 18 and 20 are coupled to a suitable subtractor circuit 22 which produces output pulses proportional to the difference in amplitude of the received video pulses from the threshold circuits 18 and 20. Such circuits for deriving an output proportional to the difference in amplitude of two input signals are well known in the art. The difference pulses are then amplified, as by an amplifier 24, and applied to a phase inverter circuit 26. Two output signals are derived from the phase inverting circuit 26, one output producing pulses of the same sense as the input pulses derived from the subtracter 22, and the other output having pulses of the opposite sense as the pulses derived from the subtracter 22.

These two signals, which may be designated as $D-X$ and $X-D$, are coupled through a pair of clipper circuits 28 and 30 respectively to adders, indicated at 32 and 34. The adder circuits are well known in the art and are used to mix two inputs an derive an output proportional to the amplitude sum of the inputs. Also coupled to the adders 32 and 34 is a signal derived from the directly-polarized component channel of the receiver 10. These video output pulses from the receiver 10 are applied to a diode limiter 35 which severely limits the amplitude of the signals coupled to the adders 32 and 34. The output of the limiter 36 is designated $\Delta D$. The clipper circuits 28 and 30 are of the conventional diode type of clipper circuits and are biased to pass positive going pulses as well as negative pulses of magnitude less than the maximum amplitude $\Delta D$ of the ground clutter pulses.

The output of the adder 32 is coupled through an amplifier 36 to the beam control grid of a cathode ray indicator tube 38. The output of the adder 34 in turn is coupled through an amplifier 40 to the beam control grid of a cathode raye indicator tube 42. The output from the limiter 35 is used for the ground mapping signal and so is applied to both indicator tubes, while the two output signals from the phase inverter 26 are coupled to the respective indicator tubes for producing the target signals.

The two cathode ray indicator tubes 38 and 42 are provided with different color phosphors, the tube 38, for example, having a red phosphor and the tube 42 having, for example, a green phosphor. The two tubes are arranged with their display surfaces at right angles and directed toward a dichroic mirror 44 by which the tube presentations are superimposed, so that the operator sees a single presentation of red and green targets on a neutral or yellow mapping background. It will be seen that when the D-signal is greater than the X-signal, a red target appears from the indicator tube 38 whereas if the X-signal is greater than the D-signal, a green target appears from the indicator tube 42. The $\Delta D$ signal portion of the input is equal in both red and green channels and produces the neutral color ground mapping. The indicator tubes 38 and 42 are provided with suitable scanning circuits (not shown) to provide either a PPI or a B-scan type presentation. It should be noted that the clipper circuits 28 and 30 provide cancellation of the ground clutter signal to the one indicator tube when the other indicator tube is receiving a target pulse. This results in a purer color indicator for individual targets.

From the above description it will be seen that the various objects of the invention have been achieved by the provision of an improved indicator for a diversity polarization radar system. The indicator circuit enables one to discriminate between targets having stronger returns in one or the other of two orthogonal polarization planes. Targets providing a strong return are indicated in one of two colors while low level ground clutter return is indicated in a neutral color, so that individual targets can be more easily identified. By the provision of threshold circuits, the strong targets can be readily separated from ground clutter.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. Radar apparatus comprising means for receiving radar echo pulses of microwave energy, said means including means having two output channels for deriving separate output pulses proportional in amplitude respectively to the directly-polarized and cross-polarized components of the received microwave energy, a lin-log amplifier coupled to each of the respective outputs of said means, a subtracter circuit coupled to the outputs of the lin-log amplifiers for producing a signal proportional to the difference between the two lin-log outputs, means for eliminating the signals applied to the subtracter means having an amplitude below a predetermined threshold level whereby only strong echo pulses are utilized, phase inverting means coupled to the difference signal output of the subtracter means for producing two signals having pulses of opposite sense, first and second clipping means coupled to the respective outputs of the phase inverting means, amplitude limiter means coupled to the directly-polarized component output of said receiving means, first and second summing means coupled respectively to the outputs of the first and second clipping means and to the output of the limiter means, a pair of cathode ray indicator tubes having different colored phosphor screens, the output of the first summing means being coupled to the intensity control of one indicator tube and the output of the second summing means being coupled to the intensity control of the second indicator tube, and means for superimposing the images formed on the screen of the two indicator tubes.

2. Radar apparatus comprising means for receiving radar echo pulses of microwave energy, said means including means having two output channels for deriving separate output pulses proportional in amplitude respectively to the directly-polarized and cross-polarized components of the received microwave energy, a lin-log amplifier coupled to each of the respective outputs of said means, a subtracter circuit coupled to the outputs of the lin-log amplifiers for producing a signal proportional to the difference between the two lin-log outputs, means for eliminating the signals applied to the subtracter means having an amplitude below a predetermined threshold level whereby only strong echo pulses are utilized, phase inverting means coupled to the difference signal output of the subtracter means for producing two signals having pulses of opposite sense, amplitude limiter means coupled to the directly-polarized component output of said receiving means, first and second summing means coupled respectively to the outputs of the phase inverting means and to the output of the limiter means, a pair of cathode ray indicator tubes having different colored phosphor screens, the output of the first summing means being coupled to the intensity control of one indicator tube and the output of the second summing means being coupled to the intensity control of the second indicator tube, and means for superimposing the images formed on the screen of the two indicator tubes.

3. Radar apparatus comprising means for receiving radar echo pulses of microwave energy, said means including means having two output channels for deriving separate output pulses proportional in amplitude respectively to the directly-polarized and cross-polarized components of the received microwave energy, a subtracter circuit coupled to the respective outputs of the receiving means for producing a signal proportional to the difference between the two outputs, means for eliminating the signals applied to the subtracter means having an amplitude below a predetermined threshold level whereby only strong echo pulses are utilized, phase inverting means coupled to the difference signal output of the subtracter means for producing two signals having pulses of opposite sense, amplitude limiter means coupled to the directly-polarized component output of said receiving means, first and second summing means coupled respectively to the outputs of the phase inverting means and to the output of the limiter means, a pair of cathode ray indicator tubes having different colored phosphor screens, the output of the first summing means being coupled to the intensity control of one indicator tube and the output of the second summing means being coupled to the intensity control of the second indicator tube, and means for superimposing the images formed on the screen of the two indicator tubes.

4. Radar apparatus comprising means for receiving radar echo pulses of microwave energy, said means including means having two output channels for deriving separate output pulses proportional in amplitude respectively to the directly-polarized and cross-polarized components of the received microwave energy, a lin-log amplifier coupled to each of the respective outputs of said means, a subtracter circuit coupled to the outputs of the lin-log amplifiers for producing a signal proportional to the difference between the two lin-log outputs, phase inverting means coupled to the difference signal output of the subtracter means for producing two signals having pulses of opposite sense, amplitude limiter means coupled to the directly-polarized component output of said receiving means, first and second summing means coupled respectively to the outputs of the phase inverting means and to the output of the limiter means, a pair of cathode ray indicator tubes having different colored phosphor screens, the output of the first summing means being coupled to the intensity control of one indicator tube and the output of the second summing means being coupled to the intensity control of the second indicator tube, and means for superimposing the images formed on the screen of the two indicator tubes.

5. Radar apparatus comprising means for receiving radar echo pulses of microwave energy, said means including means having two output channels for deriving separate output pulses proportional in amplitude respectively to the directly-polarized and cross-polarized components of the received microwave energy, a subtracter circuit coupled to the respective outputs of the receiving means for producing a signal proportional to the difference between the two outputs, phase inverting means coupled to the difference signal output of the subtracter means for producing two signals having pulses of opposite sense, amplitude limiter means coupled to the directly-polarized component output of said receiving means, first and second summing means coupled respectively to the outputs of the phase inverting means and to the output of the limiter means, a pair of cathode ray indicator tubes having different colored phosphor screens, the output of the first summing means being coupled to the intensity control of one indicator tube and the output of the second summing means being coupled to the intensity control of the second indicator tube, and means for superimposing the images formed on the screen of the two indicator tubes.

6. Apparatus for displaying information derived from two sources, the information being in the form of signals varying in amplitude over a wide dynamic range, said apparatus comprising a subtracter circuit for deriving an output signal proportional in amplitude to the difference in amplitude of two input signals, means coupling the two information signals to said subtracter circuit including means for limiting signals to those exceeding a predetermined threshold level and nonlinear amplifying means for reducing the dynamic range of the information signals, phase inverting means coupled to the output of the subtracter circuit for producing two signals of opposite phase, first and second adder circuits for deriving output signals proportional in amplitude to the sum in amplitude of two input signals, amplitude limiter means coupling one of the information signals to one input of each of the adder circuits, the other input of each of the adder circuits being coupled respectively to the two output signals from the phase inverting means, and duochromatic cathode ray indicator means including means for controlling separately the intensities of indication in either of two colors, the outputs of the adder circuits being coupled respectively to said separate intensity controlling means, whereby the output of one adder circuit controls the intensity of indication in one color and the output of the other adder circuit controls the intensity of indications in the other color.

7. Apparatus for displaying information derived from two sources, the information being in the form of signals varying in amplitude over a wide dynamic range, said apparatus comprising a subtracter circuit for deriving an output signal proportion in amplitude to the difference in amplitude of two input signals, means coupling the two information signals to said subtracter circuit including means for limiting signals to those exceeding a predetermined threshold level, phase inverting means coupled to the output of the subtracter circuit for producing two signals of opposite phase, first and second adder circuits for deriving output signals proportional in amplitude to the sum in amplitude of two input signals, amplitude limiter means coupling one of the information signals to one input of each of the adder circuits, the other input of each of the adder circuits being coupled respectively to the two output signals from the phase inverting means, and duochromatic cathode ray indicator means including means for controlling separately the intensities of indication in either of two colors, the outputs of the adder circuits being coupled respectively to said separate intensity controlling means, whereby the output of one adder circuit controls the intensity of indications in one color and the output of the other adder circuit controls the intensity of indications in the other color.

8. Apparatus for displaying information derived from two sources, the information being in the form of signals varying in amplitude over a wide dynamic range, said apparatus comprising a subtracter circuit for deriving an output signal proportional in amplitude to the difference in amplitude of two input signals, means coupling the two information signals to said subtracter circuit including non-linear amplifying means for reducing the dynamic range of the information signals, phase inverting means coupled to the output of the subtracter circuit for producing two signals of opposite phase, first and second adder circutis for deriving output signals proportional in amplitude to the sum in amplitude of two input signals, amplitude limiter means coupling one of the information signals to one input of each of the adder circuits, the other input of each of the adder circuits being coupled respectively to the two output signals from the phase inverting means, and duochromatic cathode ray indicator means including means for controlling separately the intensities of indication in either of two colors, the outputs of the adder circuits being coupled respectively to said separate intensity controlling means, whereby the output of one adder circuit controls the intensity of indication in one color and the output of the other adder circuit controls the intensity of indications in the other color.

9. Apparatus for displaying information derived from two sources, the information being in the form of signals varying in amplitude over a wide dynamic range, said apparatus comprising a subtracter circuit for deriving an output signal proportional in amplitude to the difference in amplitude of two input signals, means coupling the two information signals to said subtracter circuit, phase inverting means coupled to the output of the subtracter circuit for producing two signals of opposite phase, first and second adder circuits for deriving output signals proportional in amplitude to the sum in amplitude of two input signals, amplitude limiter means coupling one of the information signals to one input of each of the adder circuits, the other input of each of the adder circuits being coupled respectively to the two output signals from the phase inverting means, and duochromatic cathode ray indicator means including means for controlling separately the intensities of indictaion in either of two colors, the outputs of the adder circuits being coupled respectively to said separate intensity controlling means, whereby the output of one adder circuit controls the intensity of indication in one color and the output of the other adder circuit controls the intensity of indications in the other color.

No references cited.

RODNEY D. BENNETT, *Primary Examiner.*

M. F. HUBLER, *Assistant Examiner.*